United States Patent [19]

Toussaint et al.

[11] 4,308,046
[45] Dec. 29, 1981

[54] APPARATUS FOR TREATING ARTICLES

[75] Inventors: Robert Toussaint, Rixensart; Jean Henry, Wezembeek-Oppem, both of Belgium

[73] Assignee: BFG Glassgroup, Paris, France

[21] Appl. No.: 209,330

[22] Filed: Nov. 21, 1980

[30] Foreign Application Priority Data

Nov. 21, 1979 [GB] United Kingdom ............... 40350/79

[51] Int. Cl.³ ............................................. C03B 35/14
[52] U.S. Cl. ....................................... 65/168; 65/118; 65/348
[58] Field of Search ................. 65/118, 119, 168, 348, 65/349, 350, 351

[56] References Cited

U.S. PATENT DOCUMENTS

| | | | |
|---|---|---|---|
| 2,188,401 | 1/1940 | Crowley | 65/348 X |
| 3,776,712 | 12/1973 | Wilde | 65/351 X |
| 4,138,241 | 2/1979 | McKelvey | 65/351 |
| 4,187,095 | 2/1980 | Frank | 65/348 |
| 4,225,333 | 9/1980 | Frank | 65/351 X |

*Primary Examiner*—Arthur D. Kellogg
*Attorney, Agent, or Firm*—Spencer & Kaye

[57] ABSTRACT

Apparatus for treating fragile vitreous articles such as glass sheets which are apt to break when the treatment involves thermal conditioning. The apparatus includes spaced conveyor members for conveying the articles in a predetermined direction over a treatment area. To assist in the easy removal of any broken fragments of said vitreous articles, the treatment area is located beneath the conveyor members and has a plurality of heads for treating the underside of the articles. The treatment heads are retractable from a treating position, where they project into the spaces between the conveyor members, into a retracted position, where they are spaced beneath the conveyor members. A sweepable fragment collecting surface is spaced beneath said conveyor members. A sweeper is provided for cleaning the collecting surface when the treatment heads are retracted.

13 Claims, 4 Drawing Figures

APPARATUS FOR TREATING ARTICLES

BACKGROUND OF THE INVENTION

This invention relates to apparatus for treating one or more vitreous articles, such apparatus comprising spaced conveyor members for conveying said article(s) in a predetermined direction over treatment means.

The invention has particular but not exclusive reference to the treatment of a glass ribbon or glass sheets during horizontal travel thereof and may for example be embodied in apparatus for thermally tempering glass sheets. The invention extends to vitreous articles which have been treated using apparatus according to the invention.

Vitreous articles are fragile and there is a particular risk that they may be broken when they are conveyed through treatment apparatus especially when such treatment involves thermal conditioning of the articles. When breakage takes place, fragments of vitreous material are likely to fall between the spaced conveyor members and onto the treatment means. This will lead to non-uniform treatment of subsequently conveyed articles and increased risk of their breakage unless the fragments are removed.

SUMMARY OF THE INVENTION

It is an object of the present invention to provide an apparatus of the kind referred to which facilitates removal of any such fragments.

According to the present invention, there is provided apparatus for treating one or more vitreous articles, such apparatus comprising spaced conveyor members for conveying said articles in a predetermined direction over treatment means, characterised in that said apparatus comprises: treatment means located beneath said conveyor members and having a plurality of treatment heads for treating the underside of a said article during its conveyance; said treatment heads being retractable from a treating position, in which they project into the spaces between the conveyor members, into a retracted position, in which they are spaced beneath said conveyor members to leave a sweepable fragment collecting surface spaced beneath the conveyor members; and means for sweeping said surface when said treatment heads are retracted.

When the treatment heads are withdrawn, they will allow the passage of the sweeper means, so that any vitreous fragments resting on the surface can readily be swept away without risk of damage to the treatment heads. When the treatment heads are in their treating position, they project into the spaces between the conveyor members so that their ends are closer to any article carried by the conveyor, and therefore a more reliable or a more economic treatment may be carried out.

Advantageously, further treatment means are located above said conveyor members for treating the upper surfaces of articles as they are conveyed. Thus the invention may be used to treat the upper and lower surfaces of an article simultaneously.

In some embodiments of the invention, in which the treatment heads themselves are of a suitable construction, said sweepable surface is at least in part constituted by the upper surfaces of said treatment heads. This reduces or eliminates the need for any supplementary sweepable surface.

In other preferred embodiments, the upper surfaces of the treatment heads are not of a suitable construction to form a sweepable surface. In such embodiments, said sweepable surface is constituted by a platform, said treatment means are located beneath said platform, and said treatment heads are retractable from said treating position, in which they project upwardly through the platform, into a retracted position, in which they are withdrawn from the space above the platform. This allows flexibility in the choice of a particular construction of treatment head.

Preferably, said platform comprises a plurality of spaced bar members. Such a platform is very simple to construct in practice, and in the case of a fluid discharge treatment, such a platform allows a ready escape for spent treatment medium so that contamination of fresh medium discharged against the article(s) will be minimized or eliminated, thus adding to the reliability and economy of the treatment. Such bars are preferably aligned substantially at right angles to said predetermined direction of conveyance of said articles.

The treatment means may be of any desired type. In some embodiments of the invention, each treatment head is an electrical resistance heater.

Preferably, said treatment heads comprise fluid discharge tubes for discharging fluid against an article during its conveyance. The invention may thereby be used to effect various treatments, for example various coating treatments. In particular, the invention may be used for discharging a cooling gas, e.g. air, against the upper and lower surfaces of a hot vitreous article so as to effect thermal tempering thereof.

When said treatment heads are constituted as fluid discharge tubes, they are suitably arranged in rows upstanding from elongate plenum boxes so as to facilitate the supply of the discharged treatment medium.

Furthermore, such plenum boxes may be aligned in register with spaces between said conveyor members so as to allow vertical upward discharge of fluid directly against the article(s) to be treated.

Advantageously, when in the treatment position, said tubes project through holes in the platform in which they slidingly fit, so as to provide guidance and support for the tubes during their movement.

Preferably, bar members of said platform form caps for such elongate plenum boxes, so that the tops of the boxes are kept clear of fragments. This also prevents fragments from being lodged between the tubes in such a way as to prevent them from rising fully to their treatment position.

Advantageously, said treatment heads are connected to a common frame for simultaneous retraction. This greatly simplifies construction of the apparatus.

Said conveyor members are preferably rollers.

Preferably, said sweeping means is arranged to sweep said collecting surface in a direction parallel to the predetermined direction of conveyance of said articles.

Advantageously, said sweeping means comprises a bar arranged for translational movement over the surface and having at least one plate member articulated to the bar so as to be effective for sweeping in one direction only.

BRIEF DESCRIPTION OF THE DRAWINGS

Preferred embodiments of the invention will now be described in greater detail with reference to the accompanying diagrammatic drawings in which.

DESCRIPTION OF THE PREFERRED EMBODIMENT

Figure 1:
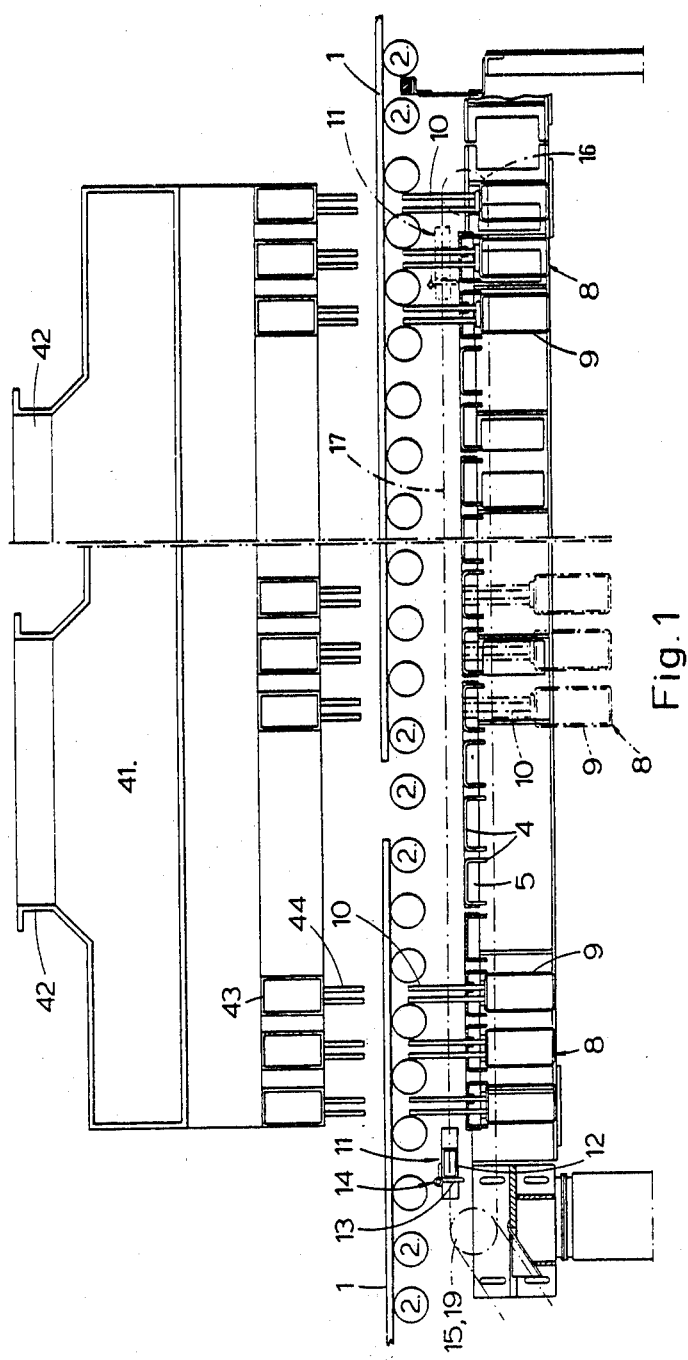
FIG. 1 is a partly sectional side view showing a first embodiment of an apparatus according to the invention.
Figure 2:
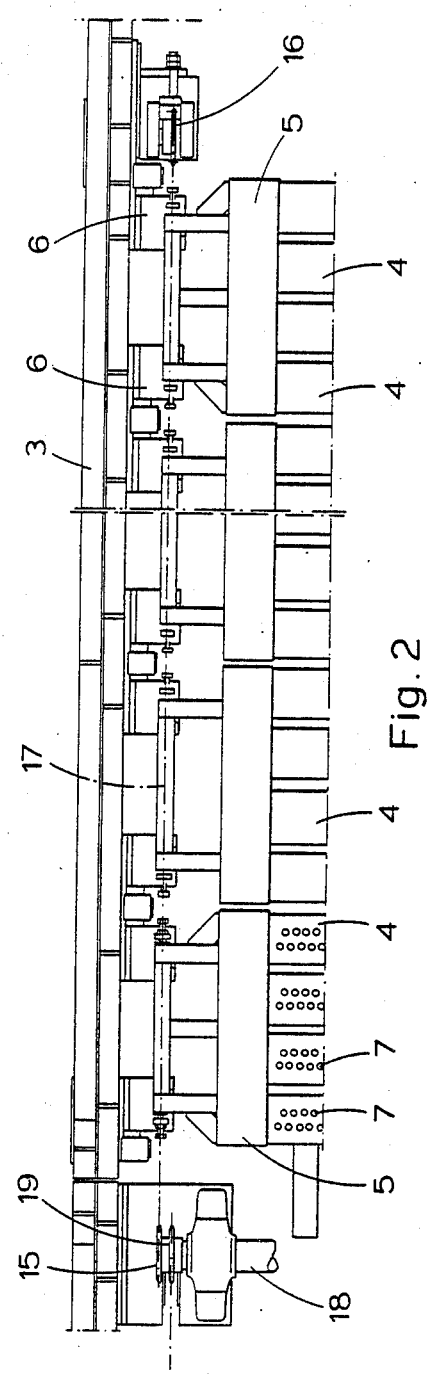
FIG. 2 is a partial plan view showing the platform of the apparatus of FIG. 1.
Figure 3:
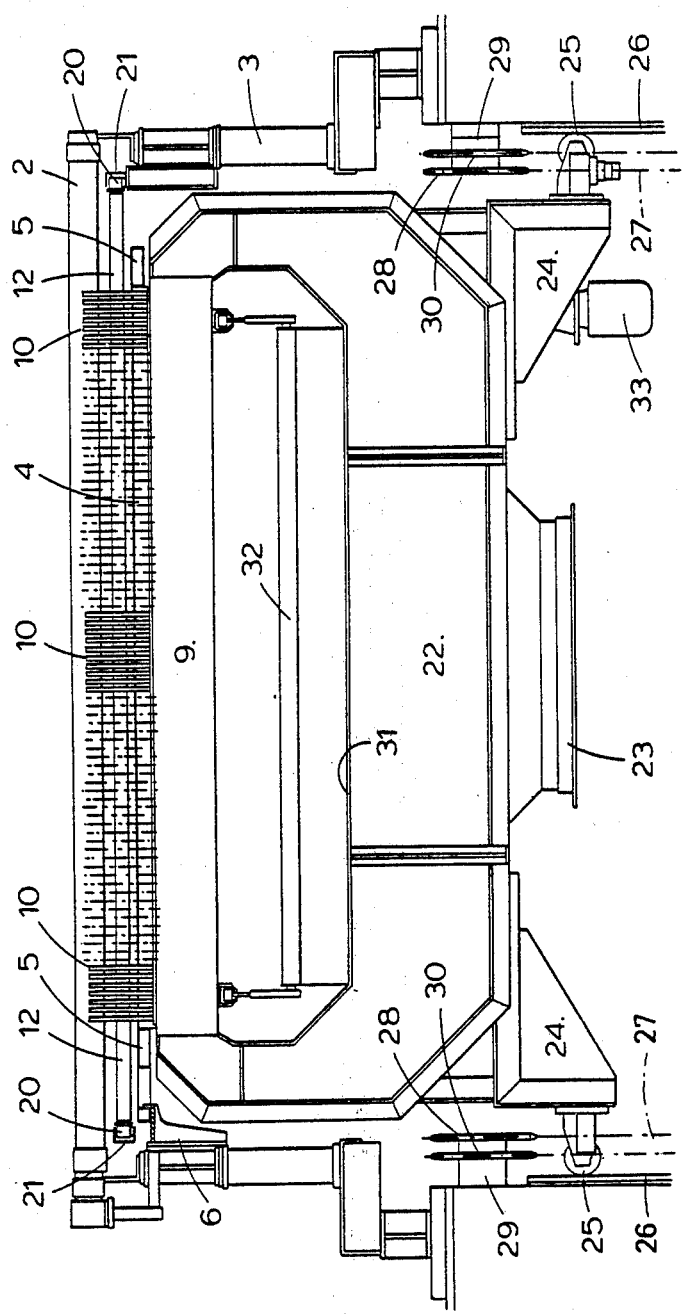
FIG. 3 is an end view of the conveyor and underlying apparatus of the embodiment shown in FIG. 1.

In FIGS. 1 and 3, a conveyor for conveying sheets 1 (or a ribbon) of glass comprises a plurality of spaced conveyor rollers 2 fixed to a main frame 3 (FIG. 3) of the machine. Also fixed to the main frame 3 of the machine is a plurality of channel-section bar members 4 arranged parallel to one another and slightly spaced apart, and which together constitute a platform spaced beneath the conveyor rollers 2. For ease of construction, the bars 4 are ganged together in groups of four by end pieces 5 which are clamped to brackets 6 on the main frame 3 to support the platform. As will be seen on the left-hand side of FIG. 2, each bar member 4 is pierced with a plurality of holes 7.

Beneath the platform defined by the bars 4 there is located the treatment means of the apparatus. In the embodiment illustrated in FIGS. 1 and 3, the treatment means comprises a plurality of retractable treatment heads 8 each consisting of an elongate plenum box 9 carrying upstanding rows of fluid discharge tubes 10. A treatment head 8 is located beneath each bar 4, and the fluid discharge tubes 10 are arranged to slidingly fit in the holes 7 in those bars. For the sake of clarity some of the treatment heads 8 have been omitted from FIG. 1. In FIG. 1, towards each side, a few treatment heads are shown in their unretracted treating position, in which the ends of the discharge tubes 10 project upwardly through the platform into the spaces between the conveyor rollers 2. In the centre of FIG. 1, a few treatment heads are shown in broken lines in their retracted positions in which they are withdrawn from the space above the platform. In fact, the ends of the tubes 10 are flush with the upper surfaces of the bars 4 when the treatment heads are fully retracted. It will be noted from FIG. 1 that the channel section bars 4 form caps for the treatment heads 8, thus reducing the risk of any fragment of broken glass lodging on top of a plenum box 9 between the fluid discharge tubes 10.

A sweeper 11 (FIG. 1) is arranged to sweep the platform beneath the rollers 2 after the treatment heads 8 have been retracted. As will be seen from FIG. 1, the sweeper comprises a bar 12 (also shown in FIG. 3) to which is attached to pivotable sweeper blade 13. In the embodiment illustrated, the sweeper blade 13 is formed as one leaf of a piano-hinge like member 14 whose other leaf or leaves is or are attached to the sweeper bar 12. The sweeper blade 13 may be formed by several axially aligned "piano-hinges" 14 if required. Each end of the sweeper bar 12 is attached to a chain (not shown) which runs round a chain drive sprocket 15 (FIG. 2) at one end of the platform and a chain idler sprocket 16 at the other end of the platform. The course of one such chain is shown at 17 in FIGS. 1 and 2. The two chain drive sprockets 15 (one of which is shown in FIG. 2) are mounted at either end of an axle 18 which is rotatable by a chain drive sprocket 19.

As will be seen from FIG. 3, the sweeper bar 12 is provided with rollers 20 at each end which run in a fixed track 21 located towards each side of the conveyor.

The embodiment illustrated in the drawings is intended for use in a thermal tempering treatment in which glass sheets 1 travelling along the conveyor 2 are rapidly cooled by air blown against them through the fluid discharge tubes 10. Thus, as best seen in FIG. 3, each end of each plenum box 9 is attached to and in communication with an air box 22 which suitably extends the full length of the apparatus and includes in its lower wall one or more impellor fan housings 23 whereby air may be drawn in for discharge via the tubes 10. In order to provide for retraction of the treatment heads of the apparatus, the air box 22 is provided with brackets 24 to which are attached rollers 25 running on fixed tracks 26. The air box 22 is supported by chains 27 attached to the brackets 24 and running over chain sprockets 28. The chain sprockets 28 are fixed to stub axles 29 at each side of the apparatus. These axles also carry driven chain sprockets 30. Rotation of the chain sprockets 28, 30 causes raising or lowering of the air box 22, and thus of the plenum boxes 9 and fluid discharge tubes 10.

FIG. 1 also illustrates treatment means for treating the upper surfaces of sheets 1 as they travel over the conveyor rollers 2. The upper treatment means illustrated consists of an air box 41 having one or more impellor fan housings 42 on its upper surface for feeding air to a plurality of elongate plenum boxes 43 and thence to discharge tubes 44. These parts may be identical in construction to the air box 22, impellor fan housing 23, plenum boxes 9 and discharge tubes 10 respectively shown in FIG. 3. The upper treatment means shown in FIG. 1 may be suspended from an overhead gantry by struts (not shown). Adjustors may be provided for varying the effective lengths of the struts so that the ends of the discharge tubes 44 can be located a suitable distance above th conveyor rollers 2.

In the thermal tempering of glass, the glass is brought to a temperature close to its softening point (where its viscosity is $10^{7.6}$ poises) and its surfaces are then rapidly cooled. In this manner, when the central regions of the glass body cool, the surface is brought under compressive stress. It will readily be appreciated that there is a risk that the glass will break during this treatment. In performing such a treatment, glass sheets 1 may be fed over the conveyor rollers 2 from left to, as shown right in FIG. 1. The air box 22 (FIG. 3) would be in its raised position so that air can be discharged from the tubes 10 (whose ends are then between the conveyor rollers 2) directly against the glass. At the same time, air is discharged onto the upper surface of the glass from the tubes 44. During normal treatment, the sweeper 11 would be located towards the right hand side of FIG. 1, e.g. at the position shown in broken lines. If a glass sheet 1 on the conveyor rollers 2 should break, fragments of glass will clearly fall down between the rollers 2 and much of it will be trapped between the tubes 10. Eventually, the tubes 10 might become blocked in some regions of the treatment zone which would lead to a non-uniform treatment and a higher risk of breakage. In order to avoid this, the air box 22 (FIG. 3) carrying the treatment heads is lowered so that the tops of the tubes 10 are flush with the surface of the platform formed by the bars 4. The sweeper 11 is then actuated so that any fragments of glass which rest on the platform are swept away. Some fragments will fall between the bars 4 onto the upper surface of the air box 22, and other fragments will be swept off the end of the platform where they may be allowed to fall into a bin. The sweeper is then returned to its starting position and the lower air box 22 and the treatment heads 8 carried thereby are raised into their operative positions ready to treat a next sheet of glass.

It is well known that tempered glass tends to "dice", that is to break into small fragments when it is broken. It is possible that many of these fragments may fall between the bars 4 of the platform on breakage of the glass or during sweeping. Such fragments would then fall onto the upper surface 31 of the air box 22 (FIG. 3). A further chain driven sweeper 32 may be provided in order to remove these fragments. This sweeper may be driven by an electric motor 33.

Figure 4:
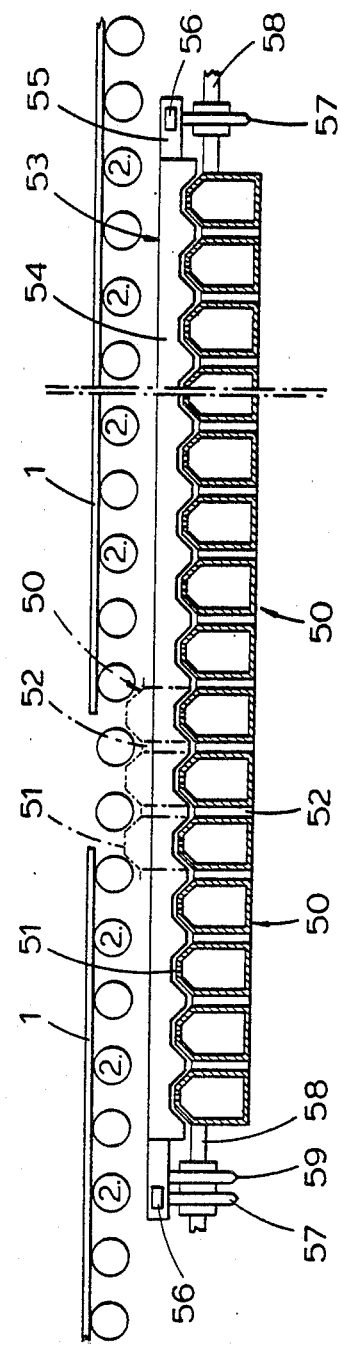
FIG. 4 is a side view of part of a second embodiment of an apparatus in accordance with the invention.

FIG. 4 illustrates an alternative embodiment of apparatus for treating the lower surface of sheets 1 of glass as they pass along a conveyor constituted by spaced rollers 2. As shown, this apparatus comprises a plurality of treatment heads 50 each constituted as an elongate plenum box having a flat-topped mansard or curb-roof 51. The treatment heads 50 are shown in solid lines in their retracted position where they form a sweepable surface constituted by the curb-roofs 51. A few of these treatment heads 50 are also indicated in dotted lines in their treating position where it will be noted that the curbing of their roofs 51 allow them to project into the spaces between the conveyor rollers 2. The flat portions of the curb-roofs 51 of the treatment heads are provided with holes or slots for directing a treatment fluid against the under surface of the glass sheets 1.

The plenum boxes 50 are connected at each end to a common feed box 52 which both supports them and supplies treatment fluid. The feed boxes 52 may in turn be connected to an air box (not shown) and thus to means for raising and lowering the treatment heads such as shown in FIG. 3.

Also shown in FIG. 4 is a chain-driven sweeper 53. As with the sweeper 11, the sweeper 53 comprises a sweeper blade 54 pivotally connected to a sweeper bar 55 to be effective for sweeping in one direction only. Because of the shaping of the surface constituted by the curb-roofs 51 of the plenum box treatment heads 50, the sweeper is arranged for sweeping movement along the treatment heads and thus transversely of the direction of conveyance of the glass sheets 1. The edge of the sweeper blade 54 is contoured to conform to the shape of the surface defined by the curb-roofs 51 of the treatment heads 50.

The sweeper 53 is driven by chains connected to chain attachment points 56 at each of its ends, the chains (not shown) passing around chain sprockets 57 mounted at each end of the treatment means on a common shaft 58 which is rotatable by a driven chain sprocket 59 at one side of the conveyor. An idler shaft and idler chain sprockets (not shown) are provided at the other side of the conveyor.

It will readily be appreciated that the apparatus shown in FIG. 4 can be substituted for the lower treatment means illustrated in FIGS. 1 to 3, and further that the treatment heads of the upper treatment means shown in FIG. 1 can be of the form shown in FIG. 4.

It will be appreciated further that apparatus according to the invention is not limited to cooling glass by blowing air against it in a thermal tempering treatment. For example, the apparatus illustrated could easily be modified to form a burner installation arranged to heat glass to a desired temperature, e.g. its softening point, so that a further treatment such as tempering could be performed at another work station.

Apparatus according to the invention can also be used in coating processes.

In a specific practical example, the apparatus shown in FIGS. 1 to 3 is used for tempering glass panels measuring 2010 mm by 730 mm by 6 mm thick. These panels are conveyed between the arrays of treatment heads which are arranged so that the ends of the discharge tubes are about 4 cm apart and extend over a conveyor length of 5 m. Each glass panel is moved in a transverse direction within this treatment zone at a speed of about 0.3 m/s for a period of about 250 s. while air is blown at a rate of 45000 $Nm^3/h$ from each of the upper and lower treatment means. By this treatment, the glass is reduced from an initial temperature of 630° C. to a temperature below 100° C., and compressive stresses are introduced into its surface layers so that it is tempered.

The blowing intensity may if desired be varied during the cooling period.

We claim:

1. Apparatus for treating one or more vitreous articles, such apparatus comprising: spaced conveyor members for conveying said articles in a predetermined direction; treatment means located beneath said conveyor members and having a plurality of treatment heads for treating the underside of such an article during its conveyance; said treatment heads being retractable from a treating position, in which they project into the spaces between the conveyor members, into a retracted position, in which they are spaced beneath said conveyor members; means defining a sweepable fragment collecting surface spaced beneath the conveyor members; and means for sweeping said surface when said treatment heads are in said retracted position.

2. Apparatus according to claim 1, further comprising further treatment means located above said conveyor members for treating the upper surface of such an article during its conveyance.

3. Apparatus according to claims 1 or 2, wherein that said sweepable surface means is constituted at least in part constituted by the upper surfaces of said treatment heads.

4. Apparatus according to claims 1 or 2, wherein said sweepable surface means is a platform; said treatment means are located beneath said platform; and said treatment heads are retractable from said treating position, in which they project upwardly through said platform, into a retracted position, in which they are withdrawn from above said platform.

5. Apparatus according to claim 4, wherein said platform comprises a plurality of spaced bar members.

6. Apparatus according to claim 5, wherein said bar members are aligned substantially at right angles to said predetermined direction.

7. Apparatus according to claim 4, wherein said treatment heads comprise fluid discharge tubes for discharging fluid against such an article during its conveyance.

8. Apparatus according to claim 7, wherein said platform includes a plurality of holes therein, whereby when in said treating position, said tubes slidingly project through said holes in said platform.

9. Apparatus according to claim 7, wherein said treatment means include elongate plenum boxes; said tubes are arranged in rows upstanding from said elongate plenum boxes; and said platform serves as a cap for said boxes.

10. Apparatus according to claims 1 or 2, further comprising a common frame, and wherein said treatment heads are connected to said common frame for simultaneous retraction of said heads.

11. Apparatus according to claims 1 or 2 wherein said conveyor members are rollers.

12. Apparatus according to claims 1 or 2, wherein said means for sweeping is arranged to sweep said collecting surface in a direction parallel to said pre-determined direction.

13. Apparatus according to claims 1 or 2, wherein said means for sweeping comprises a bar arranged for translational movement over said collecting surface; and said bar includes at least one blade member for sweeping in one direction only.

* * * * *